(12) United States Patent
Park

(10) Patent No.: US 7,637,344 B2
(45) Date of Patent: Dec. 29, 2009

(54) PEDESTRIAN PROTECTING APPARATUS OF VEHICLE HOOD

(75) Inventor: Deuk-Won Park, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 541 days.

(21) Appl. No.: 11/422,196

(22) Filed: Jun. 5, 2006

(65) Prior Publication Data

US 2007/0102219 A1    May 10, 2007

(30) Foreign Application Priority Data

Nov. 8, 2005    (KR)    ................ 10-2005-0106289

(51) Int. Cl.
*B60R 21/34*    (2006.01)
*B62D 25/12*    (2006.01)
(52) U.S. Cl. ................ 180/274; 180/69.21; 296/187.04
(58) Field of Classification Search ................ 180/274, 180/69.21; 296/187.04; 16/222, 371, 374; *B62D 25/10, B62D 25/12; B60R 21/34*
See application file for complete search history.

(56) References Cited

U.S. PATENT DOCUMENTS

| | | | |
|---|---|---|---|
| 6,942,056 B2 | 9/2005 | Nadeau et al. | |
| 7,232,178 B2 * | 6/2007 | Neal et al. | 296/187.04 |
| 7,296,624 B2 * | 11/2007 | Rodet et al. | 166/278 |
| 2005/0151393 A1 * | 7/2005 | Borg et al. | 296/187.09 |
| 2005/0182540 A1 * | 8/2005 | Sugiura et al. | 701/41 |
| 2006/0108169 A1 * | 5/2006 | Borg et al. | 180/274 |

FOREIGN PATENT DOCUMENTS

| | | | |
|---|---|---|---|
| DE | 101 16 716 A1 | * | 10/2002 |
| EP | 1577175 A1 | * | 9/2005 |
| GB | 2400826 A | * | 10/2004 |
| JP | 2004-203249 A | * | 7/2004 |
| JP | 2004-338444 A | * | 12/2004 |
| JP | 2003-182510 A | * | 7/2005 |

* cited by examiner

*Primary Examiner*—Ruth Ilan
(74) *Attorney, Agent, or Firm*—Greenblum & Bernstein, P.L.C.

(57) ABSTRACT

An actuator is longitudinally aligned along a side of the vehicle body in the fore and aft direction of the vehicle, and a lower and upper links connected to the actuator is widely opened and lift the hood, thereby minimizing the occupancy of the actuator and linkage, and preventing interference with adjacent components without changing the structure of the vehicle body. Moreover, the hood is lifted high enough for pedestrian safety using a relatively short stroke of the actuator, contributing to a formation of a compact structure as a whole and a prevention of the weight increase of the vehicle.

16 Claims, 5 Drawing Sheets

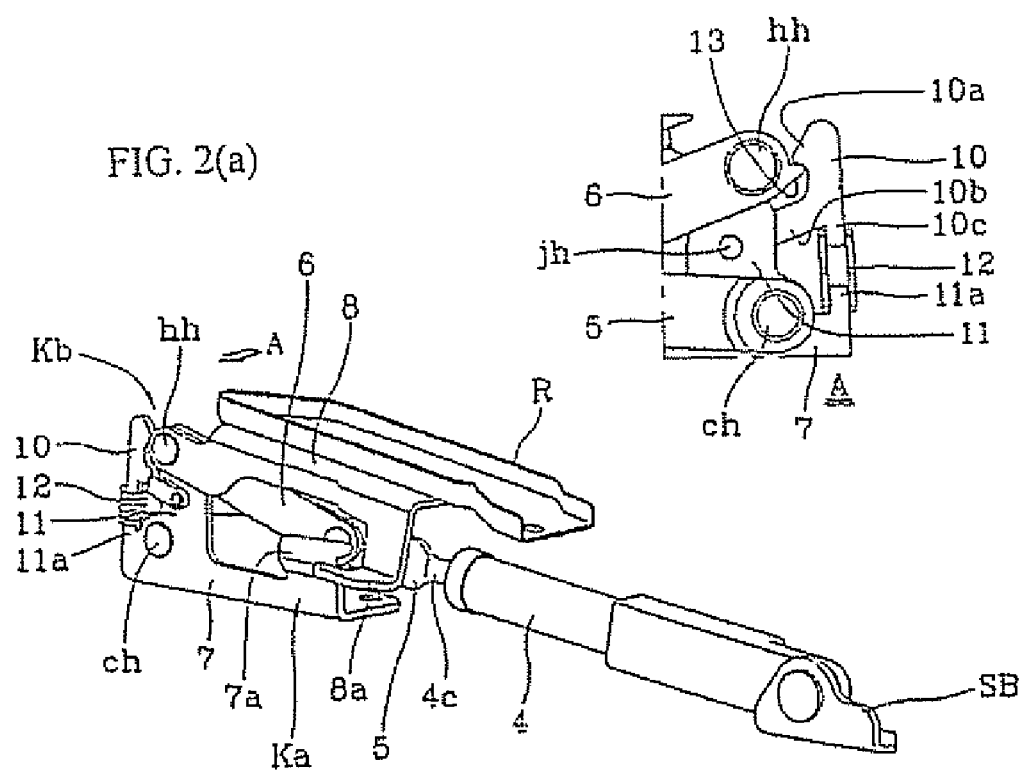

FIG. 5(a)
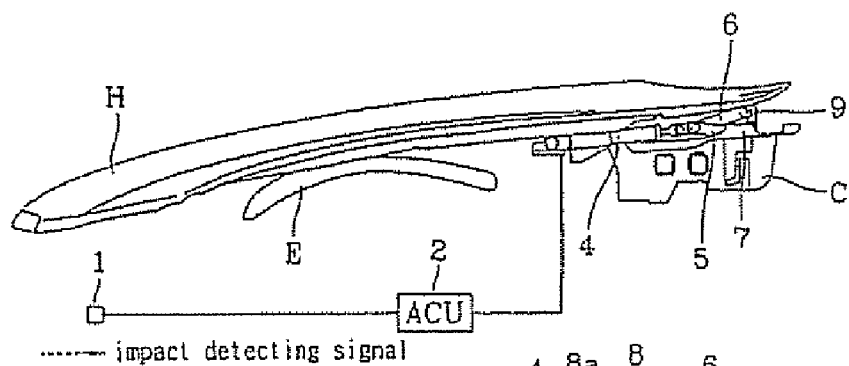
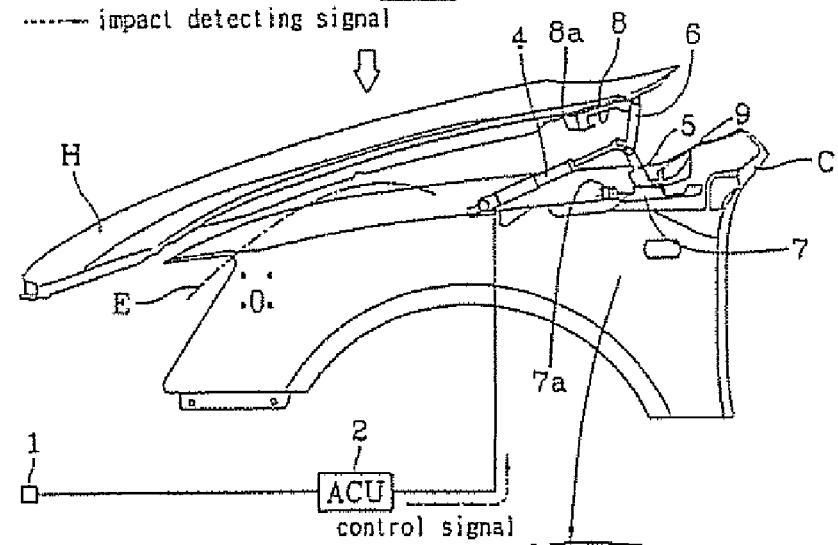
FIG. 5(b)
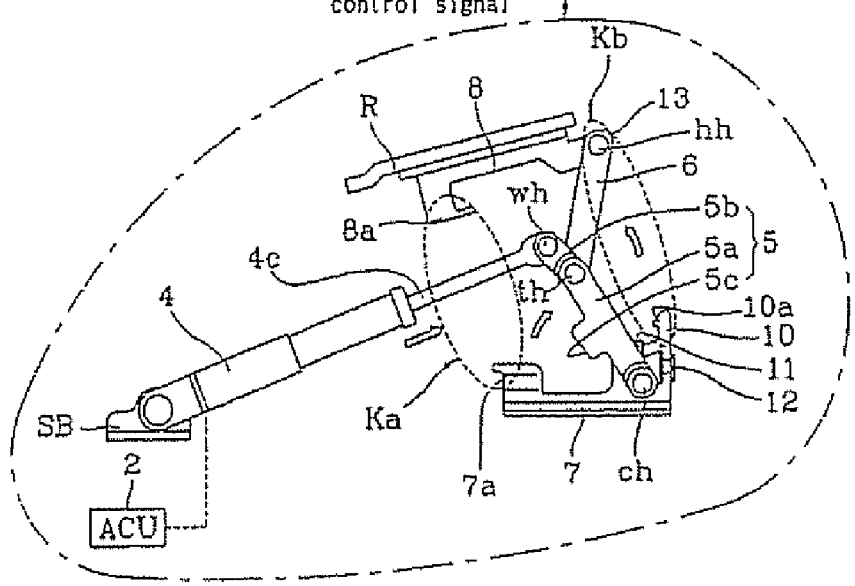
FIG. 5(c)

PEDESTRIAN PROTECTING APPARATUS OF VEHICLE HOOD

CROSS-REFERENCE TO RELATED APPLICATIONS

The present application is based on, and claims priority from, Korean Application Serial Number 10-2005-0106289, filed on Nov. 8, 2005, the disclosure of which is hereby incorporated by reference herein in its entirety.

FIELD OF THE INVENTION

The present invention relates to a vehicle hood and, more particularly, to a pedestrian protecting apparatus of the vehicle hood adapted to reduce the magnitude of injury to the pedestrian upon impact with the vehicle.

BACKGROUND OF THE INVENTION

The vehicle hood is generally a metal lid over the engine compartment and has its rear end connected to the vehicle body by hood hinges.

Nowadays, the regulation on pedestrian protection mandates that the vehicle hood be configured to attenuate injury to the pedestrian when the pedestrian is struck by the vehicle and fallen on the hood.

In order to satisfy the regulation, systems have been proposed for forcibly raising the hinged rear end of the hood in response to or immediately prior to the vehicle impacting the pedestrian, thus allowing the hood to deform downward and buffer collision impact of the pedestrian.

The hood lifting structure is typically performed with a hydraulic actuator or a pyrotechnic actuator using the explosion force for rapidly lifting the heavy hood.

However, for lifting the hood using the actuator, a mechanical structure is required to convert a linear motion of the actuator into an elevation force of the hood. This structure should be compact in configuration and facilitate the assembly and maintenance thereof.

SUMMARY OF THE INVENTION

Embodiments of the present invention form a compact structure as a whole, sufficiently and promptly raise the hood for pedestrian safety by using a short stroke of an actuator, and prevent the weight increase of the vehicle.

Furthermore, the actuator is facilitated in attachment, resulting in an improvement of the assembly and maintenance.

A pedestrian protecting apparatus of a vehicle hood comprises a controller that detects impact degree through a plurality of sensors of a bumper when a pedestrian impacts with the vehicle. An actuator is pivotally fixed at one end thereof via a support bracket to a vehicle body forming a side of an engine compartment and projects a cylinder rod by being actuated by the controller. A linkage is mounted between the vehicle body and hood and is widely opened for lifting the hood from the vehicle body while the cylinder rod of the actuator protrudes and applies a pressing force thereto.

BRIEF DESCRIPTION OF THE DRAWINGS

For a better understanding of the nature and objects of the present invention, reference should be made to the following detailed description with the accompanying drawings, in which:

FIG. 2(a) is a perspective view of a hood lifter according to one embodiment of the present invention, and FIG. 2(b) is a partial side elevation view showing a portion of the hood lifter;

FIGS. 5(a)-(c) illustrate an operation of a pedestrian protecting apparatus of a vehicle hood according to one embodiment of the present invention.

DETAILED DESCRIPTION OF THE PREFERRED EMBODIMENTS

Figure 1A:
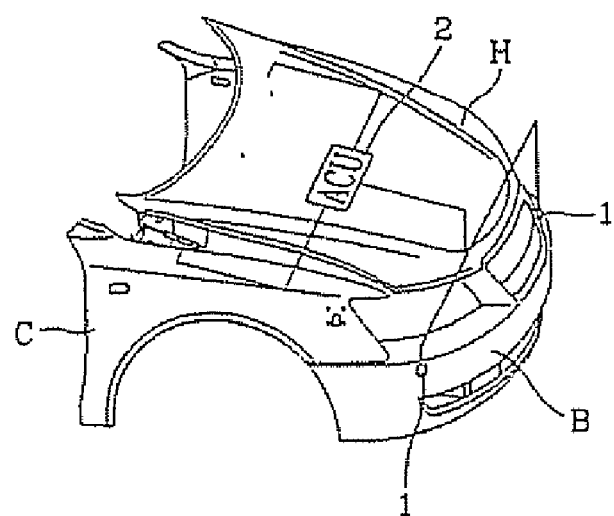
FIG. 1(a) is a perspective view of a pedestrian protecting apparatus of a vehicle hood according to one embodiment of the present invention.
Figure 1B:
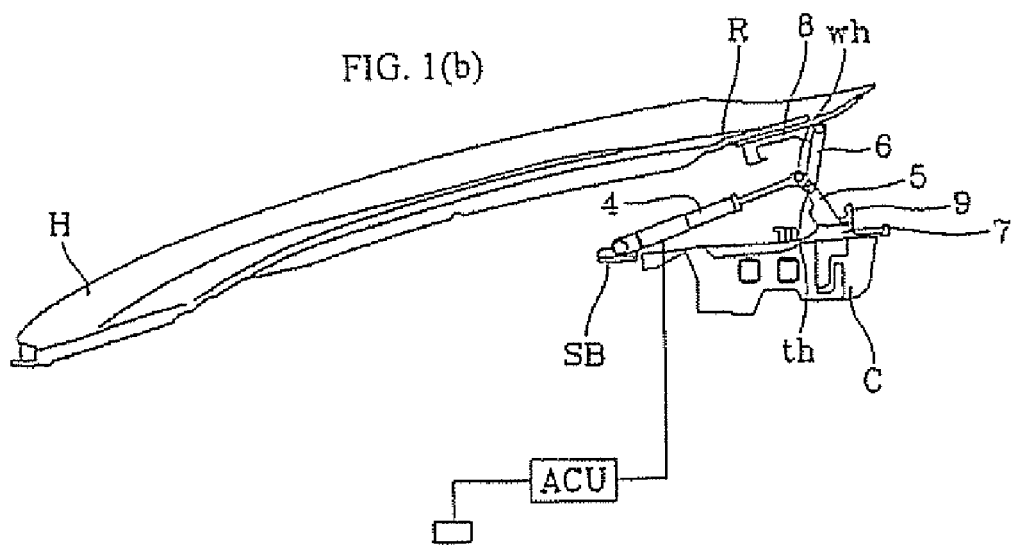
FIG. 1(b) is a side elevation view of the apparatus.
Figures 3A, 3B:
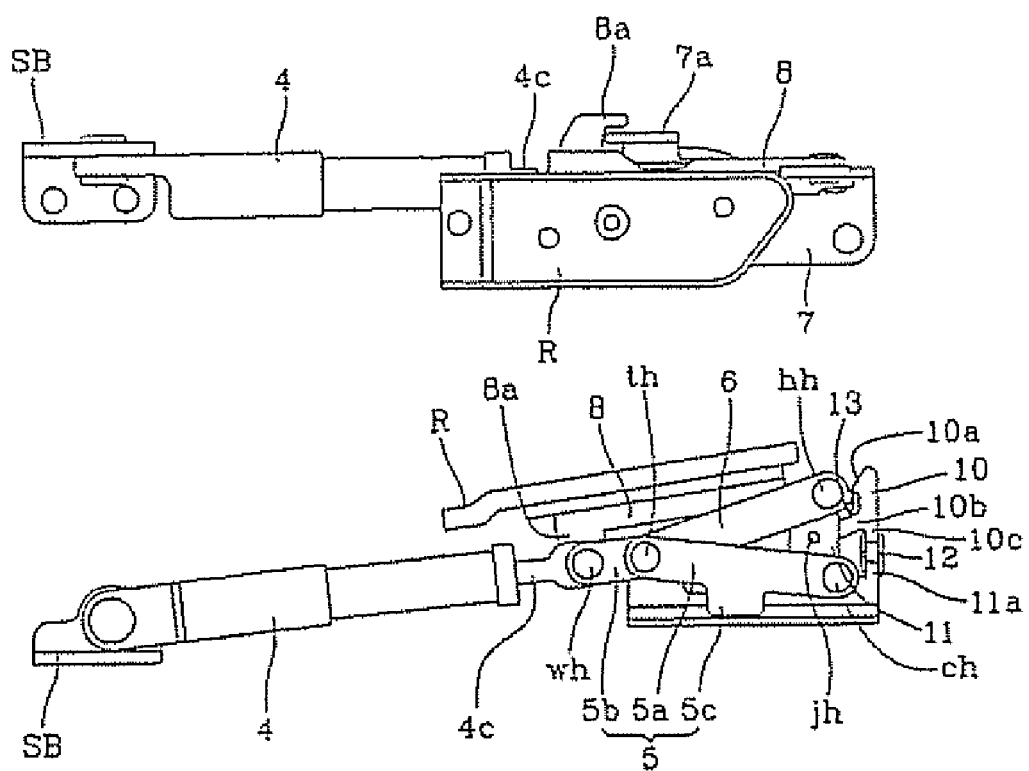
FIG. 3(a) is a side view and FIG. 3(b) is a plan view of FIG. 2.

Referring to FIGS. 1 to 3, one embodiment of the present invention includes a controller 2 that detects the impact degree through a plurality of sensors 1 of a bumper (B) when a pedestrian accidentally impacts with the vehicle. An actuator 4 is pivotally fixed at one end thereof via a support bracket (SB) to a vehicle body (C) forming a side of the engine compartment and projects a cylinder rod 4c by being actuated by controller 2. A linkage is mounted between the vehicle body and hood (H) and is widely opened for lifting the hood (H) from the vehicle body while cylinder rod 4c of actuator 4 protrudes and applies a pressing force thereto.

Actuator 4 instantaneously and linearly projects cylinder rod 4c; and a pyrotechnic type actuator is preferably used in the present invention which protrudes out cylinder rod 4c by using the exploding force of the actuator.

While the hood (H) is in a closed state, actuator 4 is in parallel with the hood beneath the hood (H). When protruding out, cylinder rod 4c of actuator 4 faces the rear of the vehicle, and the support bracket (SB) supporting actuator 4 to the vehicle body (C) is fixed on the fender of the vehicle body (C).

Controller 2 is preferably an airbag control unit (ACU) that controls the airbag of the vehicle.

Under a slight impact detected via the sensors, the ACU generates an operation signal of the actuator so as to lift the hood and protect the pedestrian without inflating the airbag.

The linkage is pivotally connected to a vehicle body (C) via a vehicle body mounting bracket 7 and a vehicle body hinge pin (ch). Similarly, linkage is pivotally connected to the hood (H) via a hood mounting bracket 8 and a hood hinge pin (hh).

The linkage includes a lower link 5 and an upper link 6, wherein lower link 5 is coupled at one end thereof via an operation hinge pin (wh) to cylinder rod 4c of actuator 4, while the other end of lower link 5 is coupled via the vehicle body hinge pin (ch) to vehicle body mounting bracket 7. Upper link 6 is coupled at one end thereof via a transmission hinge pin (th) to lower link 5, and the other end of upper link 6 is coupled via the hood hinge pin (hh) to hood mounting bracket 8.

Lower link 5 includes a support body portion 5a coupled via the vehicle body hinge pin (ch) to vehicle body mounting bracket 7. An extended connection portion 5b is extended out from support body portion 5a between the transmission hinge pin (th) (coupled with upper link 6) and the operation hinge pin (wh) (coupled with cylinder rod 4c of actuator 4).

A position restricting chin 5c protrudes downward from support body portion 5a for restraining the pivot of lower link 5. While the hood (H) is closed, position restricting chin 5c is supported at the lower portion thereof by vehicle body mounting bracket 7.

Hood mounting bracket 8 coupled with upper link 6 via a hinge is fixed at a hood reinforcing bracket (R) that reinforces the rigidity of the hood (H).

Vehicle body mounting bracket 7 and hood mounting bracket 8 are formed with a hood retreat preventing portion (Ka) for preventing a removal of the hood (H) toward the passenger compartment while the hood (H) is closed.

Hood retreat preventing portion (Ka) is composed of a lower hood receding lock chin 7a upwardly protruding at one side of vehicle body mounting bracket 7, and an upper hood receding lock chin 8a bent to protrude out to the front of lower hood receding lock chin 7a at one side of hood mounting bracket 8.

A link restrictor (Kb) restrains the pivot of upper link 6 while the hood is in a closed position.

The link restrictor (Kb) is constituted by a latch protrusion 13 protruding at one end of upper link 6. A pivot latch 10 is coupled at one end thereof via a latch hinge pin (jh) to vehicle body mounting bracket 7 and is formed with a latch chin 10a, which protrudes out for engaging with latch protrusion 13. A spring 12 is interposed between an extended support end 11a (protruding from vehicle body mounting bracket 7) and an extended latch end 10c (one end of pivot latch 10) for retaining the engaged state of pivot latch 10 with latch protrusion 13 while the hood (H) is closed.

Pivot latch 10 is also formed with an extended hinge end 10b protrusively extended and fixed via the latch hinge pin Oh) to a hinge coupling end 11 projecting from vehicle body mounting bracket 7.

FIG. 4 illustrates other embodiments of the link restrictor.

Figure 4A:
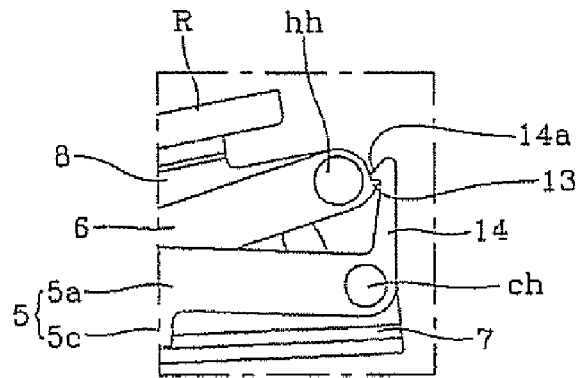
FIGS. 4(a)-(c) illustrate deformations of a link latch while a hood lifter is ceased in operation according to one embodiment of the present invention.

The link restrictor (Kb) of FIG. 4(a) includes a latch protrusion 13 protruding from one end of upper link 6. An extended pivot latch 14 extends from one end of lower link 5 toward latch protrusion 13 of upper link 6. A latch chin 14a protrudes from one end of extended pivot latch 14 for engaging with latch protrusion 13 of upper link 6.

Figure 4B:
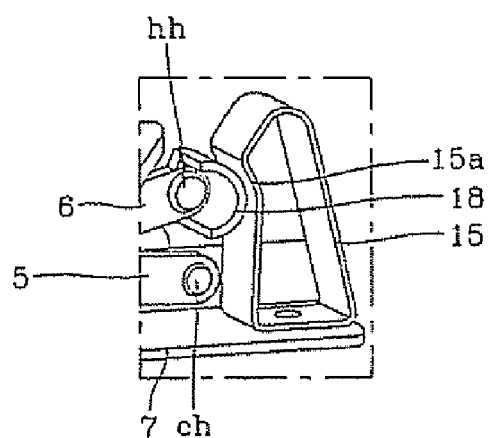

The link restrictor (Kb) of FIG. 4(b) includes a mount restraint end 18 formed at one end of upper link 6 in an arc sectional shape. A plate spring latch 15 is fixed at vehicle body mounting bracket 7 and generates a restricting force against upper link 6 through a stably mounting groove 15a that is dented for accommodating mount restraint end 18.

Figure 4C:
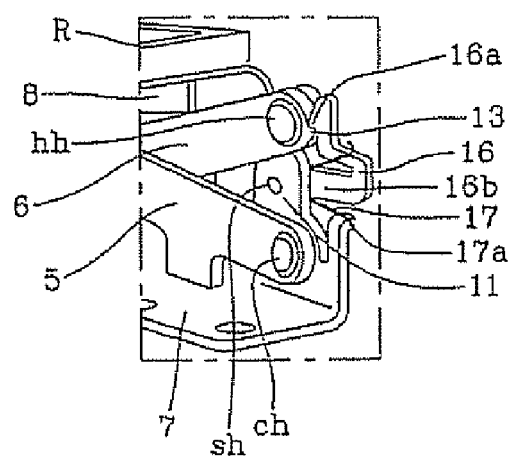

The link restrictor (Kb) of FIG. 4(c) includes a latch protrusion 13 that protrudes out from one end of upper link 6. A pivot latch 16 is formed with an extended hinge end 16b, which is fixed via a restricting hinge pin (sh) to hinge coupling end 11 protruding from vehicle body mounting bracket 7, and a latch chin 16a protruding out for engaging with latch protrusion 13. A torsion spring 17 is coupled to the restricting hinge pin (sh). One end of torsion spring 17 is fixed to pivot latch 16 while the other end is fixed to an extended support end 17a protruding from vehicle body mounting bracket 7.

The operation of the present invention will now be described with reference to FIG. 5.

In a normal state, the front of the hood (H) is supported via a hood latch to the vehicle body, and the rear of the hood (H) is stably supported via the link restrictor (Kb) to the vehicle body (C).

If the user releases the hood latch for an inspection of the engine compartment or the like, the hood (H) pivots about the hood hinge pin (hh) as a pivot shaft and is opened upward.

The link restrictor permits the hood to stably be opened and closed about the hood hinge pin (hh) by restraining the end of upper link 6 from upwardly pivoting.

In case the pedestrian collides with the vehicle under a certain impact degree, the apparatus of the present invention lifts up the rear portion of the hood, thus preventing or attenuating the impact of the pedestrian.

When receiving the impact signal from sensors 1 corresponding to the collision of the pedestrian with vehicle, the ACU detects the intensity of impact and determines as to whether the operation of actuator 4 is required.

If the ACU determines to operate actuator 4, cylinder rod 4c rapidly protrudes out from actuator 4, as illustrated in FIG. 5, and the linkage raises the rear portion of the hood (H). Cylinder rod 4c of actuator 4 slightly pivots upward, accordingly.

That is, if lower link 5 of the linkage receives a force from cylinder rod 4c, extended connection portion 5b of lower link 5 pivots upward about the vehicle body hinge pin (ch) of vehicle body mounting bracket 7.

Next, upper link 6 connected via the transmission hinge pin (th) to lower link 5 moves upward via the rotational force of lower link 5. Thus, the hood (H) is raised at the rear portion thereof about the hood latch as a pivot point. This separates the hood (H) from an engine cover (E) and forms a gap therebetween for absorbing or lessening impact of the pedestrian fallen on the hood (H).

When the hood (H) is lifted, the link restrictor (Kb) releases the restraint of upper link 6.

That is, when upper link 6 is raised by lower link 5 and latch protrusion 13 pushes latch chin 10a of pivot latch 10, pivot latch 10 slightly pivots about the latching hinge pin (jh) and latch protrusion 13 of upper link 6 escapes from latch chin 10a of pivot latch 10.

Spring 12 supporting pivot latch 10 is compressed in response to the pivot degree of pivot latch 10.

Identical operation is accomplished in the other embodiments of the link restrictor (Kb).

In case of FIG. 4(c), under a normal state, latch chin 16a of pivot latch 16 restricts latch protrusion 13 of upper link 6, and thus, the rear portion of the hood (H) is stably supported by the vehicle body (C); however, once actuator 4 operates, latch protrusion 13 of upper link 6 moves upward and pushes latch chin 16a of pivot latch 16. The pivot of pivot latch 16 deforms torsion spring 17 and allows an upward motion of upper link 6.

If extended pivot latch 14 is integrally formed at a distal end of lower link 5 (see FIG. 4(a)), as actuator 4 operates, extended pivot latch 14 pivots with lower link 5 according to the pivot of lower link 5 and withdraws from latch protrusion 13 of upper link 6, thus allowing the release of upper link 6.

If mount restraint end 18 of upper link 6 is restrained by plate spring latch 15 (see FIG. 4(b)), as actuator 4 operates, mount restraint end 18 elastically deforms plate spring latch 15 corresponding to the pivot of upper link 6 and escapes from stably mounting groove 15a.

Since upper hood receding lock chin 8a of hood mounting bracket 8 (fixed to the hood (H)) and lower hood receding lock chin 7a of vehicle body mounting bracket 7 (fixed to the vehicle body (C)) are distantly installed in a fore/aft direction of the vehicle (see FIG. 3), the hood retreat preventing portion (Ka) gives no effect to each other while the hood (H) ascends.

Provided that the hood (H) is raised, lower link 5 and upper link 6 are widely opened, as shown in FIG. 5(c), by cylinder rod 4c. This state is maintained with the gas pressure maintained in actuator 4. In case the pedestrian is fallen on the hood (H) of the vehicle and applies impact thereon, actuator 4, lower link 5, and upper link 6 attenuate the impact.

If the impact from the pedestrian on the hood (H) is transmitted to upper link 6, upper link 6 pivots downward and presses lower link 5. As lower link 5 moves down, actuator 4 connected to lower link 5 is shortened in length and descends the hood (H) for absorbing impact transmitted to the pedestrian.

When lower link 5 inserts cylinder rod 4c into actuator 4, cylinder rod 4c exhausts the gas of actuator 4 and smoothly buffers the impact applied to the pedestrian.

The gas exhaust from actuator 4 is a typical structure of the pyrotechnic type actuator, wherein when cylinder rod 4c forcibly presses the gas in actuator 4, the gas is discharged by a piston formed with a vent hole, or the like.

The gas discharging speed of actuator 4 should appropriately be set through experiments and calculations for optimally buffering the impact of the pedestrian.

As apparent from the foregoing, there is an advantage in that the apparatus of the present invention is configured to allow a linkage, connected to each other via hinges, to be widely opened and lift the hood (H) according to the linear motion of an actuator longitudinally aligned along a side of the vehicle body in the fore/aft direction of the vehicle, thereby minimizing the occupancy of the actuator and linkage, and obviating interference with adjacent components without changing the structure of the vehicle body.

Furthermore, the actuator of the present invention is aligned lengthwise along the side of the vehicle body and fixed at both ends thereof via hinge pins so that only the linkage is installed in the vehicle during the print coating process and the actuator may be attached after the completion of the coating process.

Still further, the cylinder rod of the actuator is designed to pressurize the center portion of the hinged linkage for opening the linkage, thereby enabling to lift the hood high enough according to the length adjustment of the linkage and form a compact structure by using the actuator having a relatively short stroke.

What is claimed is:

1. A pedestrian protecting apparatus of a vehicle hood, comprising:
   a controller that detects an impact degree through a plurality of sensors of a bumper when a pedestrian impacts with the vehicle;
   an actuator that is pivotally fixed at one end thereof via a support bracket to a vehicle body forming a side of an engine compartment and projects a cylinder rod configured to be actuated by said controller; and
   a linkage that is mounted between the vehicle body and the vehicle hood and is widely opened to lift the hood from the vehicle body while said cylinder rod of said actuator protrudes and applies a pressing force thereto;
   wherein said linkage is pivotally connected to the vehicle body via a vehicle body mounting bracket and a vehicle body hinge pin, and said linkage is pivotally connected to the vehicle hood via a hood mounting bracket and a hood hinge pin;
   wherein said linkage includes:
   a lower link that is coupled at one end thereof via an operation hinge pin to said cylinder rod of said actuator, while the other end of said lower link is coupled via said vehicle body hinge pin to said vehicle body mounting bracket; and
   an upper link that is coupled at one end thereof via a transmission hinge pin to said lower link, while the other end of said upper link is coupled via said hood hinge pin to said hood mounting bracket.

2. The apparatus as defined in claim 1, wherein said support bracket is fixed on a fender of the vehicle body.

3. The apparatus as defined in claim 1, wherein said actuator is a pyrotechnic type actuator.

4. The apparatus as defined in claim 1, wherein said lower link includes:
   a support body portion that is coupled via said vehicle body hinge pin to said vehicle body mounting bracket; and
   an extended connection portion that extends from said support body portion between said transmission hinge pin coupled with said upper link and said operation hinge pin coupled with said cylinder rod of said actuator.

5. The apparatus as defined in claim 4, wherein a position restricting chin protrudes downward from said support body portion to restrain a pivot of said lower link, wherein while the hood is closed, said position restricting chin is supported at a lower portion thereof by said vehicle body mounting bracket.

6. The apparatus as defined in claim 1, wherein said hood mounting bracket coupled with said upper link via a hinge is fixed at a hood reinforcing bracket that reinforces rigidity of the hood.

7. The apparatus as defined in claim 1, wherein said vehicle body mounting bracket and said hood mounting bracket are formed with a hood retreat preventing portion to prevent a removal of the hood toward a passenger compartment while the hood is closed.

8. The apparatus as defined in claim 7, wherein said hood retreat preventing portion includes:
   a lower hood receding lock chin that upwardly protrudes at one side of said vehicle body mounting bracket; and
   an upper hood receding lock chin that is bent to protrude out to a front of said lower hood receding lock chin at one side of said hood mounting bracket.

9. The apparatus as defined in claim 1, wherein while the hood is in a closed state, said actuator is in parallel with the hood underneath the hood, and said cylinder rod of said actuator projects toward a rear of the vehicle.

10. The apparatus as defined in claim 1, wherein said controller is an airbag control unit that controls an airbag mounted in the vehicle.

11. The apparatus as defined in claim 1, further comprising a link restrictor that restricts a pivot of said upper link while the hood is in a closed state.

12. The apparatus as defined in claim 11, wherein said link restrictor comprises:
   a latch protrusion that protrudes at one end of said upper link;
   a pivot latch that is coupled at one end thereof via a latch hinge pin to said vehicle body mounting bracket and is formed with a latch chin, which protrudes out to engage with said latch protrusion; and
   a spring that is interposed between an extended support end which protrudes from said vehicle body mounting bracket and an extended latch end of said pivot latch to restrain an engaged state of said pivot latch with said latch protrusion while the hood is closed.

13. The apparatus as defined in claim 12, wherein said pivot latch is also formed with an extended hinge end protrusively extending and fixed via said latch hinge pin to a hinge coupling end that projects from said vehicle body mounting bracket.

14. The apparatus as defined in claim 11, wherein said link restrictor comprises:
   a latch protrusion that protrudes from one end of said upper link;
   an extended pivot latch that extends from one end of said lower link toward said latch protrusion of said upper link; and a latch chin that protrudes from one end of said extended pivot latch to engage with said latch protrusion of said upper link.

15. The apparatus as defined in claim 11, wherein said link restrictor comprises:
   a mount restraint end that is formed at one end of said upper link in an arc sectional shape; and
   a plate spring latch that is fixed at said vehicle body mounting bracket and generates a restricting force against said upper link through a stably mounting groove, the plate spring latch dented to accommodate said mount restraint end.

16. The apparatus as defined in claim 11, wherein said link restrictor comprises:
   a latch protrusion that protrudes from one end of said upper link;
   a pivot latch that is formed with an extended hinge end, which is fixed via a restricting hinge pin to a hinge coupling end of said vehicle body mounting bracket, and a latch chin protruding out to engage with said latch protrusion; and
   a torsion spring that is coupled to said restricting hinge pin, wherein one end of said torsion spring is fixed to said pivot latch while the other end is fixed to an extended support end that protrudes out from said vehicle body mounting bracket.

* * * * *